US009701818B2

(12) United States Patent
Tseng et al.

(10) Patent No.: US 9,701,818 B2
(45) Date of Patent: *Jul. 11, 2017

(54) PACKING MATERIAL FOR PRESERVING FRUITS AND VEGETABLES AND PRODUCING METHOD THEREOF

(71) Applicant: Plastics Industry Development Center, Taichung (TW)

(72) Inventors: Hsiang-Jung Tseng, Taichung (TW); Chao-Shuan Chang, Taichung (TW); Ming-Hsien Sung, Taichung (TW)

(73) Assignee: Plastics Industry Development Center, Taichung (TW)

( * ) Notice: Subject to any disclaimer, the term of this patent is extended or adjusted under 35 U.S.C. 154(b) by 188 days.

This patent is subject to a terminal disclaimer.

(21) Appl. No.: 14/283,258

(22) Filed: May 21, 2014

(65) Prior Publication Data

US 2015/0337119 A1    Nov. 26, 2015

(51) Int. Cl.
| | |
|---|---|
| *C08K 9/02* | (2006.01) |
| *C08K 7/26* | (2006.01) |
| *C08K 3/24* | (2006.01) |
| *C08K 3/26* | (2006.01) |
| *C08K 5/098* | (2006.01) |
| *C08K 9/04* | (2006.01) |
| *B65D 85/34* | (2006.01) |

(52) U.S. Cl.
CPC .................. *C08K 7/26* (2013.01); *C08K 3/24* (2013.01); *C08K 3/26* (2013.01); *C08K 5/098* (2013.01); *C08K 9/02* (2013.01); *C08K 9/04* (2013.01); *B65D 85/34* (2013.01); *C08K 2003/265* (2013.01)

(58) Field of Classification Search
CPC ....................................................... C08K 9/02
See application file for complete search history.

(56) References Cited

U.S. PATENT DOCUMENTS

| | | | | |
|---|---|---|---|---|
| 4,670,288 A | * | 6/1987 | Ikari ...................... | A01N 59/16 106/15.05 |
| 2008/0305027 A1 | * | 12/2008 | Johnston ................ | B01D 53/02 423/339 |
| 2013/0034638 A1 | * | 2/2013 | Goyanes ................ | A23B 7/154 426/323 |

FOREIGN PATENT DOCUMENTS

| | | | |
|---|---|---|---|
| CN | 103304877 A | * | 9/2013 |
| JP | 58220648 A | * | 12/1983 |
| JP | 01284754 A | * | 11/1989 |

OTHER PUBLICATIONS

English abstract of Hori (JP 1-284754).*
English abstract of Zhang et al. (CN 103304877).*

* cited by examiner

*Primary Examiner* — Michael Pepitone
(74) *Attorney, Agent, or Firm* — Alan D. Kamrath; Kamrath IP Lawfirm, P.A.

(57) ABSTRACT

A producing method for fruit and vegetable fresh packing material has steps of (1) mixing porous granules, material and water, (2) blending the porous granules, material and water until the water is removed to form a dry mixing powder, and (3) mixing the dry mixing powder with plastic matrix material and forming plastic granules. Thus, a bag or a packing material may be produced using the plastic granules by standard plastic producing methods, such that the bag or packing material with an outstanding fruit preservation ability may be produced by a very simple way.

9 Claims, 6 Drawing Sheets

PACKING MATERIAL FOR PRESERVING FRUITS AND VEGETABLES AND PRODUCING METHOD THEREOF

BACKGROUND OF THE INVENTION

1. Field of Invention

This invention is related to a packing material for preserving fruits and vegetables especially for prolonging the preserving time.

2. Description of the Related Art

Vegetables play an important part in human health. It has become a popular study in modern society, since ingesting fruits and vegetables provide many benefits.

Food storage equipment like a refrigerator, which is very helpful to preserve fruits and vegetables, is available. However, for the purpose of displaying in the market or deliveries, fruits and vegetables suffer a decay problem that is really harmful to maintain a fresh status of the fruits and vegetables. There are some conventional multiple layered packing materials providing limited preservative functions, but these packing materials still have a lot of problems that need to be solved, such as high cost, complicated producing processes and insufficient preservative functions.

SUMMARY OF THE INVENTION

In order to solve the disadvantages and shortcomings of the conventional packing materials such as high cost, troublesome producing processes and the insufficient preserving abilities, the present invention provides a producing method of packing material for preserving fruits and vegetable including the steps of:

blending multiple porous granules with blend-promoting materials, with the multiple porous granules being porous silicon oxide and with the blend-promoting materials having calcium carbonate;

blending material with gradually spraying a certain quantity of water into the multiple porous granules and the blend-promoting materials, with the material absorbing, catching, trapping or reacting with ethylene and may be bromide solution, potassium permanganate or potassium bromide;

forming a dry mixing powder after removing a majority of water during blending process, with the material totally or partially coated on a surface of the multiple porous granules and/or filled in pores of the multiple porous granules; and blending the dry mixing powder with a plastic matrix material and granulating the dry mixing powder and the plastic matrix material as plastic pellets. The plastic matrix material is polyethylene.

According to the above mentioned, the invention has some advantages:

1. By blending the multiple porous granules with the plastic matrix material, the packing material for preserving fruits and vegetables has an extraordinary ability to preserve fruits and vegetables, since the multiple porous granules in the packing material may absorb or trap or even react with the ethylene released by fruits and vegetables. The packing bag or the packing material has the excellent ability of preserving fruits and vegetables, since it is made from the multiple porous granules that the material able to absorb ethylene or react with ethylene is added.

2. The invention is very easy to produce and may use conventional mass production equipment to form as a packing bag, only a one layer structure is required, and the invention provides best test results compared with the conventional prior art.

DETAILED DESCRIPTION OF THE INVENTION

Figure 1:
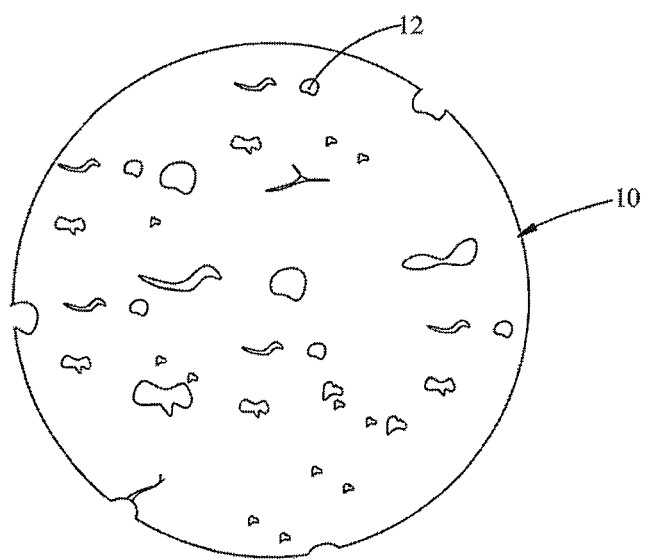
FIG. 1 is a perspective view of porous granules of a preferred embodiment in accordance with the present invention.
Figure 2:
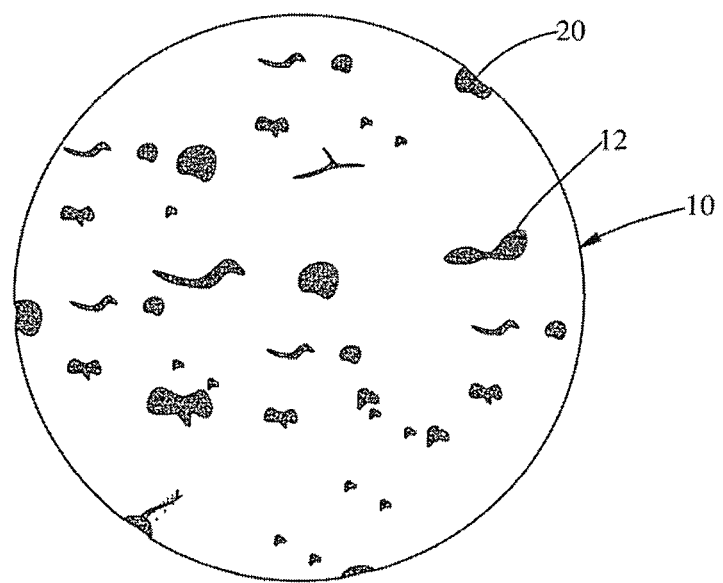
FIG. 2 is a perspective view of modified porous granules of the preferred embodiment in accordance with the present invention.
Figure 3:
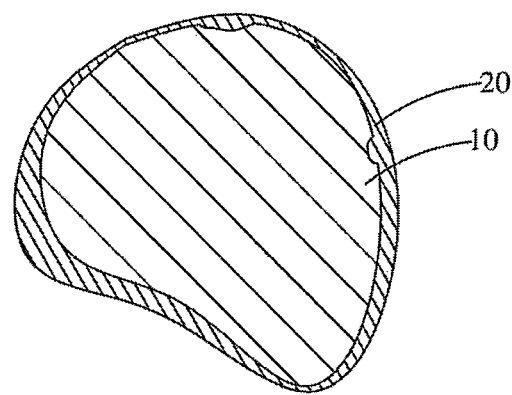
FIG. 3 is a cross-sectional view of the modified porous granules of the preferred embodiment in accordance with the present invention.

With reference to FIGS. 1 to 5, a preferred embodiment of a producing method of packing material for preserving fruits and vegetables in accordance with the present invention has the steps of:

(1) blending multiple porous granules 10 with blend-promoting material. The blend-promoting material may be calcium carbonate (CaCO3). The main component of the porous granules 10 is preferably porous silicon oxide (silica). A surface area of each porous granule 10 is preferably greater than 120 ($m^2/g$). The particle size of the porous granules 10 is preferably in a range of 2 um~12 um.

(2) adding material 20 and water or a solvent into the porous granules 10 and the blend-promoting material, where the water and the solvent are pre-blended into the material 20 as a liquid solution and then blended with the porous granules 10 and the blend-promoting material. The water or the solvent maybe in a liquid spray form to be added into the porous granules 10 and the blend-promoting material. In the preferred embodiment, the material 20 is added into the water or the solvent as a liquid form to increase the material 20 being permeated in pores 12 on surfaces of the porous granules 10. The material 20 is capable of absorbing, catching or trapping ethylene or may react with ethylene, and the material 20 may be bromide solution, potassium permanganate, potassium bromide and mixtures thereof;

(3) blending the material 20 and solvent or liquid with the porous granules 10 and the blend-promoting material until the water or solvent is totally or partially removed during the blending process. Partial or all surfaces or the pores of the porous granules 10 are coated or filled with the material 20 by gradually removing the water to form a dry mixing powder during the blending process, and a granular portion of the dry mixing powder is shown as FIG. 2 and FIG. 3. The aforementioned water or solvent removing process may use a blending machine, such as using a Henschel to blend in about 400 RPM. The material 20 thus may be filled into the pores 12 or partially or totally attached to the surfaces of the porous granules 10. For improving a process time for blending and removing water or solvent, heating may be used. The heating may comprise, but is not limited to, blending under humidity control and/or temperature control at range of 85~105° C., or naturally heating to remove water or solvent by the blending process. A higher blending temperature may reduce process time to form the dry mixing powder; and (4) mixing the dry mixing powder with a plastic matrix material and forming as plastic pellets. The plastic matrix material may be polyethylene. The plastic pellets may be produced by using a double screw extruder. The plastic pellets are melted and blended uniformly for producing as thin films or bags. By using the functional plastic pellets, a thin film or a bag 50 may be easily produced by standard mass production solutions.

Figure 4:
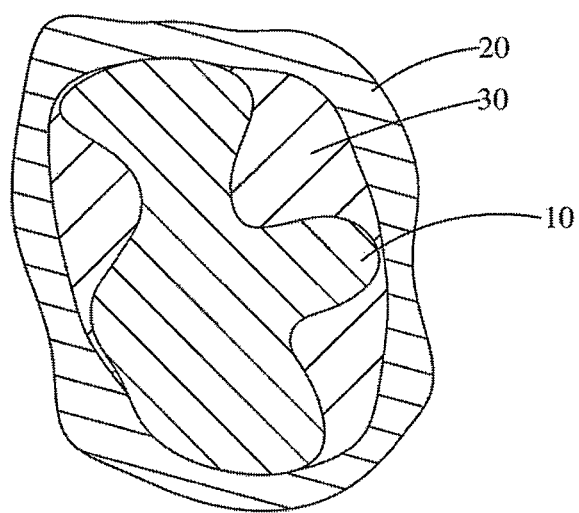
FIG. 4 is the second cross-sectional view of the modified porous granules of the preferred embodiment in accordance with the present invention.
Figure 5:
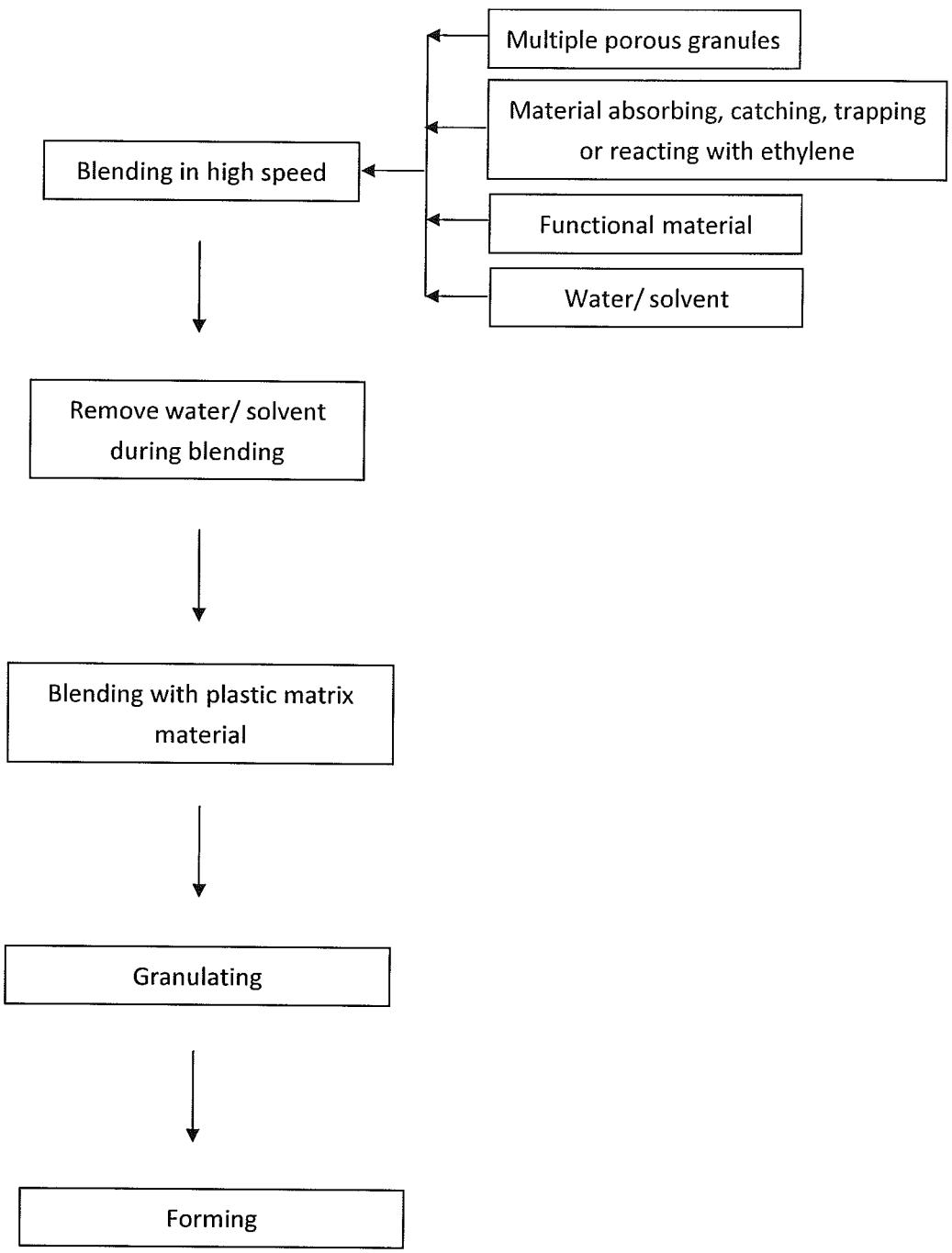
FIG. 5 is a producing process flow diagram in accordance with the present invention.

With reference to FIG. 4, before or after step (2), a mould-proof material may be added to be coated on the surfaces of the porous granules 10 or be partly filled in the pores 12 of the porous granules 10. In the preferred embodiment, the mould-proof material is blended with the porous granules 10 until the water is totally or partially removed, and then blending with the material 20 solution or liquid to form the dry mixing powder by another blending process. Thus, the dry mixing powder may form as a core shell structure as shown in FIG. 4. The mould-proof material 30 may be a sorbate, like 2, 4-hexadienoic acid potassium salt.

Additionally, a functional material may be added and mixed with the dry mixing powder such as a bacteriostatic agent. The bacteriostatic agent may release silver ions or zinc ions to prevent or reduce bacteria. The blending process for the bacteriostatic agent may be either mixing dry bacteriostatic powder directly with the dry mixing powder or removing the water by the blending process.

Embodiment 1

First, blend porous silicon oxide (with 1.5~7.5 wt % of the plastic pellets) and potassium carbonate (with 0.2~2.0 wt % of the plastic pellets).

Second, blend with 2,4-hexadienoic acid potassium salt solution and then gradually remove water.

Third, blend with a solution containing 2~8 wt % of potassium permanganate, and removing the water to form the dry mixing powder.

Finally, remove or volatilize the solvent or water in the solution containing the bacteriostatic agent by a blending process or by blending with heat assisted. Produce plastic pellets by blending the dry mixing powder and plastic matrix material.

Embodiment 2

First, blend porous silicon oxide (with 1.5~7.5 wt % of the plastic pellets) and the water absorbing material.

Second, blend with a solution containing 2~6 wt % potassium permanganate, and removing the water by blending again to form the dry mixing powder.

Third, remove the solvent or water in the solution containing the bacteriostatic agent by blending or by blending with heat assisted.

In the end, produce plastic pellets by mixing a plastic matrix material with the dry mixing powder.

Embodiment 3

First, blend a porous silicon oxide (with 1.5~7.5 wt % of plastic pellets) and the water absorbing material.

Second, blend with the solution which contains 2~6 wt % of potassium permanganate, and remove the water or solvent of the solution again to form the dry mixing powder.

Third, form mixed plastic matrix material and the dry mixing powder as the plastic pellets.

In the end, blend more plastic material containing a bacteriostatic agent with a required quantity of the plastic pellets and form the uniform blended plastic material and the melted plastic pellets as the packing material for preserving fruits and vegetables by suitable processes, such as extrusion and air blown processes. The packing material is capable of absorbing or trapping ethylene or is able to react with ethylene. Thus, a fruit packed inside the packing material may remain fresh longer. Further, the packing material may have a bacteriostatic agent therein, so that fruits or vegetables packed therein may further prevent bacteria.

Figure 6:
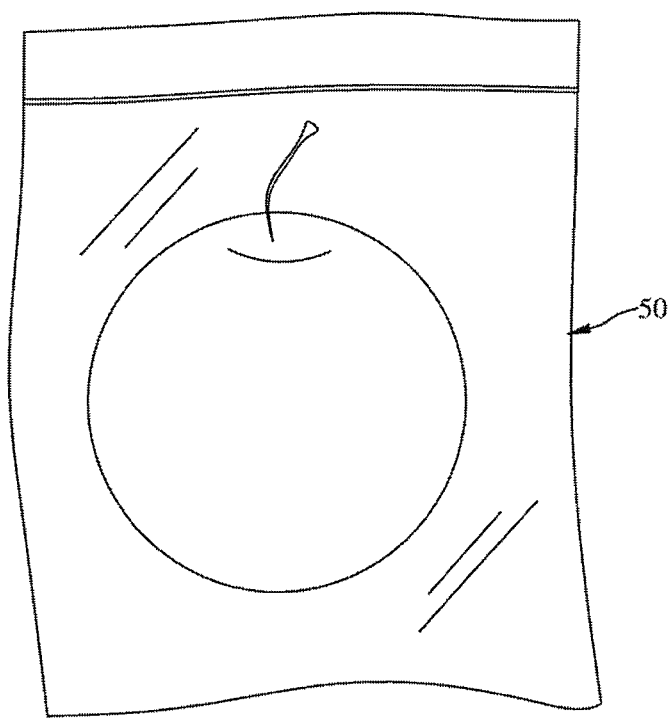
FIG. 6 is a perspective view of the preferred embodiment packing fruit inside in accordance with the present invention.

With reference to FIG. 6, the present invention may be used in preserving agricultural products and prolonging a preserving period after harvesting. The main reason why harvested fruits and vegetables rot so easily is because the fruits and vegetables release ethylene naturally after being harvested. The released ethylene increases the rot speed of the fruits and vegetables. In the present embodiment, packing material comprising the porous granules 10 with the material 20 thereon may absorb or react with the released ethylene, so that the pores on the porous granules 10 may trap ethylene to prolong the preservation period. Moreover, the present embodiment may also be germ-proof and mould-proof to fulfill all requests of the preserving function by adding various functional materials to strengthen the ability of preserving, germ-proof and mould-proof.

To verify the ethylene absorption ability of the present embodiment and the prior art, ethylene and the aforementioned packing material in the embodiment are sealed in different sampling bottles. Residual ethylene in the sampling bottles is examined at a given sampling rate to ensure the ethylene absorbing ability of these tested packing materials. The packing material of the present invention and the packing material of the prior arts are sliced into squares pieces and are put into different sampling bottles and sealed with 100 ppm ethylene with sampling rates 24 hours, 60 hours and 84 hours. Table 1 shows the residual quantity of ethylene remaining in the sampling bottle measuring by FTTS-FA-018 testing standard. As a result, the preferred embodiment of the present invention has the best ability of absorbing ethylene among the other samples of the prior art.

TABLE 1

|  | Time (hrs) | | |
| --- | --- | --- | --- |
|  | 24 | 60 | 84 |
| Regular PE plastic bag | 83.67 | 83.4 | 83.2 |
| Contract product | 66.36 | 69.29 | 66.8 |
| The invention (dry mixing powder) | 60.87 | 58.69 | 52.46 |
| Addition of the activated carbon film | 62.89 | 60.76 | 59.1 |
| Addition of the calcium oxide film | 80.49 | 73.12 | 74.59 |
| Addition of the silicon oxide film | 70.97 | 71.25 | 64.34 |

A packing bag 50 produced by the packing material of the present invention is used to compare the ability of extending the preservation time of fruits with the other conventional packing bags. The packing bag 50 made from the embodiment has a certain ability for preserving. The packing bag 50 with the extra addition of Sorbate into the plastic matrix material shows a better ability for preserving and mould-proof.

A mango test used the packing bag 50 of the present invention and packing bags of the prior art to wrap mangos therein respectively. At the first day, the mangos in three testing samples all remained in fresh. At day 5, the mango with the packing bag of the prior art shows black spots on the skin of the mango. The mango packed in the packing bag 50 in the present invention remains fresh. At day 10, the skin of the mangos packed in the packing bag of the prior art turned black for nearly 100% surface area, but the mango in the packing bag 50 of the present invention only shows a few little spots on the skin of the mango.

For a guava test, guavas wrapped by a PE bag, a prior art packing bag A, a prior art packing bag B, a packing bag 50 of the present invention C (porous silicon oxide+sorbate) and a packing bag 50 of the present invention D (the porous silicon oxide+sorbate) are compared. At the first day, all samples remain fresh. At day 4, the guava without any packing has already decomposed. At day 5, the guavas in the PE bag and in the prior art packing bags A, B are decomposed. At day 9, only the guavas in the embodiments still remain in good condition.

According to the above mentioned, the invention has advantages listed as below:

1. By blending the multiple porous granules with the plastic matrix material, the packing material for preserving fruits and vegetables has an extraordinary ability to preserve fruits and vegetables, since the multiple porous granules in the packing material may absorb or trap or even react with the ethylene released by fruits and vegetables. The packing bag or the packing material has the excellent ability of preserving fruits and vegetables, since it is made from the multiple porous granules that the material able to absorb ethylene or react with ethylene is added.

2. The invention is very easy to produce and may use conventional mass production equipment to form as a packing bag, only a one layer structure is required, and the invention provides best test results compared with the conventional prior art.

What is claimed is:

1. A producing method of packing material for preserving fruits and vegetables comprising:
   blending multiple porous granules with blend-promoting materials, wherein the multiple porous granules are porous silicon oxide;
   gradually spraying a quantity of water containing material absorbing, catching, trapping or reacting with ethylene into the multiple porous granules and the blend-promoting materials during blending;
   forming a dry mixing powder by removing a majority of water during blending, wherein the material is totally or partially coated on surfaces of the multiple porous granules and/or filled in pores of the multiple porous granules; and
   blending the dry mixing powder with a plastic matrix material and granulating the dry mixing powder and the plastic matrix material as plastic pellets.

2. The producing method of packing material for preserving fruits and vegetables as claimed in claim 1, wherein the blend-promoting materials have calcium carbonate.

3. The producing method of packing material for preserving fruits and vegetables as claimed in claim 2, wherein the plastic matrix material is polyethylene.

4. The producing method of packing material for preserving fruits and vegetables as claimed in claim 3, further comprising blending and melting the plastic pellets to produce thin films or bags.

5. The producing method of packing material for preserving fruits and vegetables as claimed in claim 4, further comprising before or after gradually spraying the quantity of water into the multiple porous granules and the blend-promoting materials, blending a mould-proof material with the multiple porous granules until the majority of water is removed, to be partially or totally coated on the surfaces of the multiple porous granules and filled in the pores, wherein the mould-proof material is 2, 4-hexadienoic acid potassium salt.

6. The producing method of packing material for preserving fruits and vegetables as claimed in claim 5, wherein forming includes heating to assist removal of said majority of water.

7. The producing method of packing material for preserving fruits and vegetables as claimed in claim 6, wherein heating is temperature control at a range of 85~105° C., is humidity control, or is naturally heating up by blending.

8. The producing method of packing material for preserving fruits and vegetables as claimed in claim 6, wherein after gradually spraying, adding a bacteriostatic agent and blending until the majority of water is removed.

9. The producing method of packing material for preserving fruits and vegetables as claimed in claim 1, wherein the material comprises bromide solution, potassium permanganate or potassium bromide.

* * * * *